United States Patent
Balasubramanian et al.

(10) Patent No.: US 10,470,012 B1
(45) Date of Patent: Nov. 5, 2019

(54) PORTABLE WIRELESS COMMUNICATIONS ADAPTER

(71) Applicant: Goodrich Corporation, Charlotte, NC (US)

(72) Inventors: Rameshkumar Balasubramanian, Bangalore (IN); Pullaiah Dussa, Kudlu (IN); Michael A. Lynch, Shelburne, VT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/258,788

(22) Filed: Jan. 28, 2019

(51) Int. Cl.
*H04W 4/42* (2018.01)
*H01Q 1/24* (2006.01)
*H01Q 5/30* (2015.01)
*H04B 5/00* (2006.01)
*H04W 4/021* (2018.01)
*H04W 12/06* (2009.01)
*H04W 12/00* (2009.01)
*H01Q 1/52* (2006.01)
*H04W 88/10* (2009.01)

(52) U.S. Cl.
CPC .............. *H04W 4/42* (2018.02); *H01Q 1/246* (2013.01); *H01Q 1/526* (2013.01); *H01Q 5/30* (2015.01); *H04B 5/0037* (2013.01); *H04W 4/021* (2013.01); *H04W 12/009* (2019.01); *H04W 12/06* (2013.01); *H04W 88/10* (2013.01)

(58) Field of Classification Search
CPC ..... H04W 4/42; H04W 4/021; H04W 12/009; H04W 12/06; H01Q 5/30; H01Q 1/246; H01Q 1/526; H04B 5/0037
See application file for complete search history.

(56) References Cited

U.S. PATENT DOCUMENTS

| 8,613,385 | B1 | 12/2013 | Hulet et al. |
| 9,178,567 | B2 | 11/2015 | Klein et al. |
| 9,334,063 | B2 | 5/2016 | Baumgarten et al. |
| 9,698,467 | B2 | 7/2017 | Mitchell |

(Continued)

OTHER PUBLICATIONS

Technical characteristics and operational objectives for wireless avionics intra-communications (WAIC), Report ITU-R M2197, International Telecommunication Union, Nov. 2010, 58 pages.

*Primary Examiner* — Devan A Sandiford
(74) *Attorney, Agent, or Firm* — Kinney & Lange, PA

(57) ABSTRACT

A portable wireless communications adapter includes a wireless antenna and wireless access point electronics configured to communicated wirelessly with a portable electronic device. The portable wireless communications adapter further includes a wireless receiver, a wireless transmitter, and a location sensing module. The wireless receiver is configured to receive Wireless Avionics Intra-Communication (WAIC) communications over a WAIC frequency range between 4.2 gigahertz (GHz) and 4.4 GHz. The wireless transmitter is configured to send WAIC communications over the WAIC frequency range. The location sensing module is configured to determine a location of the portable wireless communications adapter relative to an interior of an aircraft based on WAIC communications received at the wireless receiver, and selectively enable and disable the wireless transmitter based on the determined location.

20 Claims, 4 Drawing Sheets

(56) References Cited

U.S. PATENT DOCUMENTS

| | | | |
|---|---|---|---|
| 10,177,868 B2 * | 1/2019 | Timm | G01S 13/34 |
| 2007/0087763 A1 * | 4/2007 | Budampati | H04W 12/06 |
| | | | 455/456.5 |
| 2009/0282469 A1 * | 11/2009 | Lynch | H04W 12/06 |
| | | | 726/11 |
| 2010/0189089 A1 * | 7/2010 | Lynch | H04B 7/18506 |
| | | | 370/338 |
| 2011/0009057 A1 | 1/2011 | Saunarnaki | |
| 2011/0255528 A1 * | 10/2011 | Zakrzewski | H04J 3/0667 |
| | | | 370/350 |
| 2012/0188997 A1 * | 7/2012 | Zakrzewski | H04J 3/0667 |
| | | | 370/350 |
| 2012/0243463 A1 | 9/2012 | Aguirre et al. | |
| 2012/0263165 A1 * | 10/2012 | Zakrzewski | H04W 56/009 |
| | | | 370/350 |
| 2016/0075443 A1 * | 3/2016 | Schmutz | G08G 5/0013 |
| | | | 701/14 |
| 2016/0095045 A1 | 3/2016 | Salomon et al. | |
| 2017/0180919 A1 | 6/2017 | Rittner | |
| 2017/0230916 A1 * | 8/2017 | Stein | H02J 50/20 |
| 2018/0197357 A1 * | 7/2018 | Haukom | G07C 5/0816 |
| 2019/0031366 A1 | 1/2019 | Lauer | |
| 2019/0118978 A1 * | 4/2019 | Fanton | B64D 45/00 |

\* cited by examiner

PORTABLE WIRELESS COMMUNICATIONS ADAPTER

CROSS-REFERENCE TO RELATED APPLICATION(S)

This application claims the benefit of India Provisional Application No. 201841029926 filed Aug. 9, 2018 for "PORTABLE WIRELESS COMMUNICATIONS ADAPTER" by Rameshkumar Balasubramanian, Pullaiah Dussa, and Michael A. Lynch.

BACKGROUND

The present disclosure relates generally to wireless communications, and in particular to a portable wireless communications adapter.

Modern aircraft typically transmit data between sensors and systems positioned about the aircraft using wired aircraft data buses, such as serial or other wired data buses. Using the data buses, data is routed between producing systems and consuming systems for operational control of the aircraft. Certain data is routed to flight display systems, such as primary flight displays (PFDs) or an electronic flight instrument system (EFIS) located in the aircraft cockpit.

Recently, portable electronic devices such as tablet computers have been used in the cockpit as ancillary interfaces which display certain aircraft operational data and receive user input for, e.g., flight planning, flight optimization, takeoff and landing checklists, prognostic and diagnostic health operations, or other aircraft flight planning and control operations. The portable electronic devices provide supplemental interfaces for display and user input without requiring additional display and/or input devices mounted in the cockpit, thereby reducing space, weight, and cost associated with the additional interfaces.

The portable electronic devices often communicate wirelessly with one or more aircraft systems and devices to receive information for display and to transmit user input information for operational control of the aircraft. Such wireless communications, though often encrypted or otherwise protected, are typically transmitted over frequency ranges that are accessible to commercially available electronic devices, such as the 900 megahertz (MHz), 2.4 GHz, 3.6 GHz, 5 GHz, and/or 60 GHz frequency bands. Indeed, the portable electronic devices used as ancillary pilot and/or crew interfaces are also often commercially available off-the-shelf (COTS) devices which communicate wirelessly in one or more of the standard frequency bands.

More recently, to decrease the space, weight, and cost associated with wired aircraft data buses, wireless communication between aircraft systems and/or sensors has been considered. To increase available bandwidth and to enhance security, the Wireless Avionics Intra-Communications (WAIC) standard has been proposed. The WAIC standard specifies wireless communications in a frequency range between 4.2 gigahertz (GHz) and 4.4 GHz. In addition, the WAIC standard specifies that WAIC communications are limited to wireless communications only between aircraft systems and/or components.

SUMMARY

In one example, a portable wireless communications adapter includes a wireless antenna, wireless access point electronics, a wireless receiver, a wireless transmitter, and a location sensing module. The wireless antenna and wireless access point electronics are configured to communicate wirelessly with a portable electronic device. The wireless receiver is configured to receive Wireless Avionics Intra-Communication (WAIC) communications over a WAIC frequency range between 4.2 gigahertz (GHz) and 4.4 GHz. The wireless transmitter is configured to send WAIC communications over the WAIC frequency range between 4.2 GHz and 4.4 GHz. The location sensing module is configured to determine a location of the portable wireless communications adapter relative to an interior of an aircraft based on WAIC communications received at the wireless receiver, selectively enable the wireless transmitter to send WAIC communications in response to determining that the portable wireless communications adapter is located within the interior of the aircraft, and selectively disable the wireless transmitter to prevent the wireless transmitter from sending WAIC communications in response to determining that the portable wireless communications adapter is not located within the interior of the aircraft.

In another example, a method includes establishing, using a wireless antenna and wireless access point electronics of a portable wireless communications adapter, a wireless communications session with a portable electronic device for wireless communications between the portable wireless communications adapter and the portable electronic device. The method further includes receiving, by a wireless receiver of the portable wireless communications adapter, Wireless Avionics Intra-Communication (WAIC) communications over a WAIC frequency range between 4.2 gigahertz (GHz) and 4.4 GHz, and determining, by the portable wireless communications adapter, location of the portable wireless communications adapter relative to an interior of an aircraft based on the WAIC communications received over the WAIC frequency range. The method further includes selectively enabling a wireless transmitter of the portable wireless communications adapter to send WAIC communications over the WAIC frequency range corresponding to wireless data received from the portable electronic device via the wireless communications session in response to determining that the portable wireless communications adapter is located within the interior of the aircraft. The method further includes selectively disabling the wireless transmitter to prevent the wireless transmitter from sending WAIC communications over the WAIC frequency range in response to determining that the portable wireless communications adapter is not located within the interior of the aircraft.

DETAILED DESCRIPTION

Figure 1:
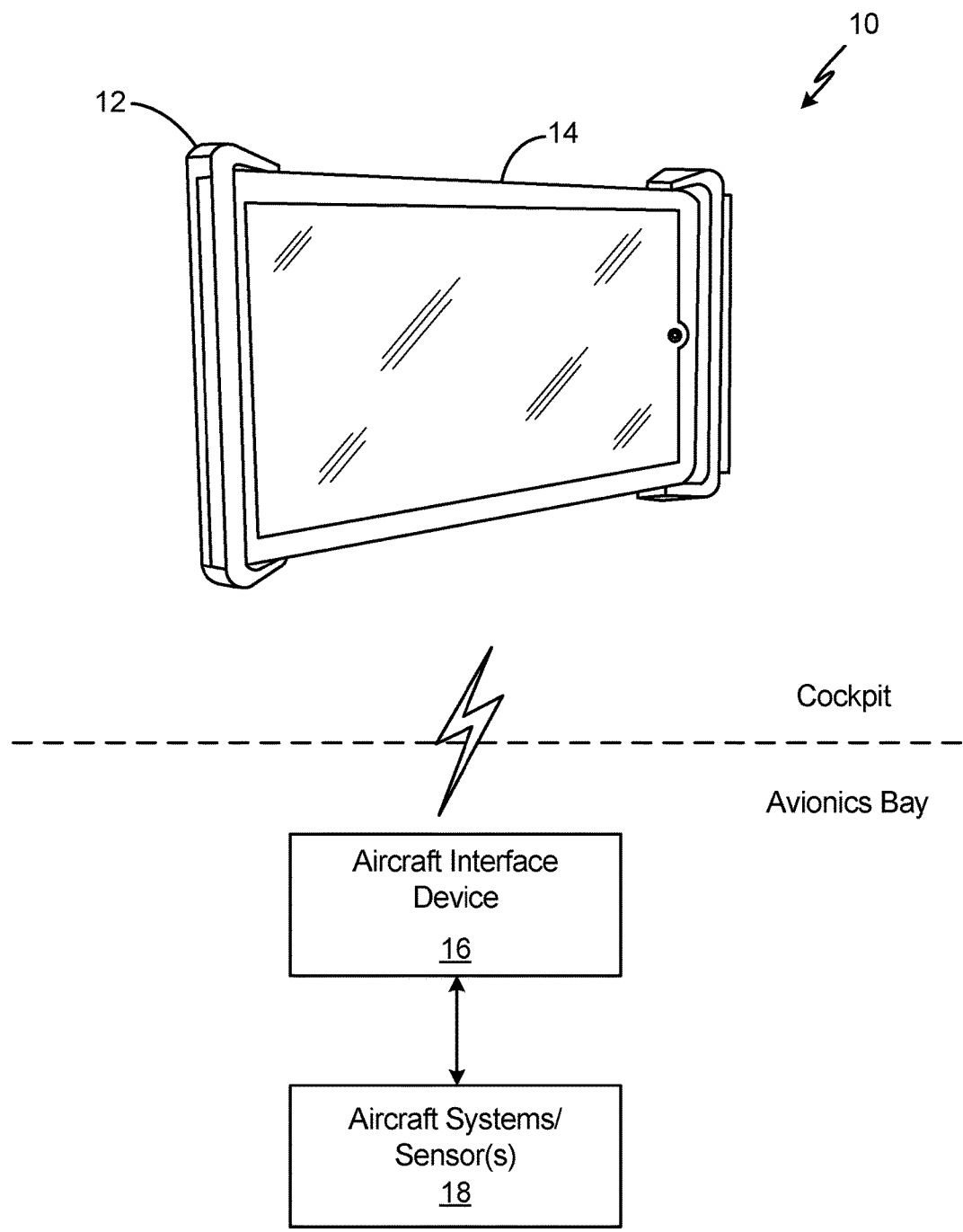
FIG. 1 is a schematic block diagram of an example system including a portable wireless communications adapter engaged with a portable electronic device for communicating with one or more aircraft systems.

As described herein, a portable wireless communications adapter includes a wireless antenna and wireless access point (WAP) electronics configured to establish a wireless communications session with a portable electronic device, such as a tablet computer, a laptop computer, a mobile phone (e.g., a smartphone), or other portable electronic device. The wireless communications session between the portable wireless communications adapter and the portable electronic device can be configured for sending and receiving wireless data via, e.g., the Institute of Electrical and Electronics Engineers (IEEE) 802.11 protocol, the IEEE 802.15.1 protocol, or other standard or proprietary communication protocols in, for example, the 900 megahertz (MHz), 2.4 GHz, 3.6 GHz, 5 GHz, and/or 60 GHz frequency bands. Accordingly, wireless communications between the portable wireless communications adapter and the portable electronic device can be accomplished via standard or proprietary communication protocols in frequency bands typically supported by commercially available off-the-shelf (COTS) devices.

The portable wireless communications adapter further includes a wireless transceiver configured to send and receive Wireless Avionics Intra-Communication (WAIC) communications over a WAIC frequency range between 4.2 gigahertz (GHz) and 4.4 GHz. The portable wireless communications adapter routes data between the portable electronic device (via the wireless communications session) and one or more aircraft systems and/or sensors via WAIC communications in the frequency range between 4.2 GHz and 4.4 GHz. Moreover, to enhance security and to adhere to the WAIC standard specifying that WAIC communications are limited to only those wireless communications between aircraft systems and/or components of the same aircraft, the portable wireless communications adapter described herein determines a location of the adapter relative to an interior and an exterior of the aircraft. The portable wireless communications adapter selectively disables a transmitter of the wireless transceiver in response to determining that the portable wireless communications adapter is not located within the interior of the aircraft, and selectively enables the transmitter of the wireless transceiver in response to determining that the adapter is located within the interior of the aircraft.

In some examples, the portable wireless communications adapter selectively enables and disables the transmitter of the wireless transceiver based on known unique identifiers of one or more authorized portable electronic devices and/or known unique identifiers of one or more authorized aircraft, thereby further enhancing security by limiting use of the adapter to certain portable electronic devices, certain aircraft, or both. As such, a portable wireless communications adapter implementing techniques of this disclosure enables secure WAIC communications between commercially available off-the-shelf (COTS) electronic devices and aircraft systems and/or sensors while adhering to WAIC standards that limit such wireless communications to only those communications between systems or other components of the aircraft.

FIG. 1 is a schematic block diagram of system 10 including portable wireless communications adapter 12 engaged with portable electronic device 14. As illustrated in FIG. 1, system 10 can further include aircraft interface device 16 and one or more aircraft systems and sensors 18.

Aircraft interface device 16 and one or more aircraft systems and sensors 18, as illustrated, can be positioned in an avionics bay or other area of an aircraft within which aircraft sensors or other electronics are located. Aircraft systems and sensors 18 can be any aircraft sensors and/or corresponding systems used for monitoring or operational control of the aircraft, such as pressure sensors, temperature sensors, speed sensors, engine systems, flight control systems, flight management computers, or other aircraft systems and/or sensors.

Aircraft interface device 16 can be any electronic device having one or more processors and computer-readable memory configured to receive data from one or more producing systems, such as aircraft systems and sensors 18, and route the received data to one or more consuming systems, such as flight management computers, air data computers, flight control systems, aircraft navigation systems, or other consuming systems. Aircraft interface device 16 is electrically and/or communicatively coupled with one or more aircraft systems and sensors 18 to send and receive aircraft operational and/or sensor data via wired or wireless communications, or both. For instance, in some examples, aircraft interface device 16 is electrically coupled with one or more aircraft systems and sensors 18 via a serial and/or digital communications data bus, such as a communications data bus that communicates via the Aeronautical Radio, Incorporated (ARINC) 429 or other communications protocol. In certain examples, aircraft interface device 16 is communicatively coupled to communicate with one or more aircraft systems and sensors 18 via wireless communications over the WAIC frequency range between 4.2 gigahertz (GHz) and 4.4 GHz.

In the example of FIG. 1, aircraft interface device 16 is configured to send and receive WAIC communications (i.e., wireless communications in a frequency range between 4.2 GHz and 4.4 GHz) with portable electronic device 14 via portable wireless communications adapter 12. Though the example of FIG. 1 illustrates WAIC communications only between aircraft interface device 16 and portable wireless communications adapter 12, it should be understood that in certain examples, portable wireless communications adapter 12 can communicate directly with one or more aircraft systems and sensors 18 via WAIC coordinators positioned on the same aircraft.

Portable electronic device 14 can be a tablet computer, mobile phone (e.g., a smartphone), laptop computer, or other portable electronic device capable of displaying information to a user and, in some examples, receiving user input in the form of button actuations, user gestures received at a touch sensitive display, or other user input. For instance, portable electronic device 14 can be a tablet computer having processors and computer-readable memory configured to execute a software application that interfaces with aircraft interface device 16 or other electronic devices of the aircraft to display aircraft operational data and receive user inputs for, e.g., flight planning, flight optimization, or other aircraft interface operations.

Portable electronic device 14, in some examples, is a commercially available off-the-shelf (COTS), military commercial off-the-shelf (Mil-COTS), or other portable electronic device configured to communicate via wired connection, such as via a Universal Serial Bus (USB) or other wired connection and/or wirelessly via, e.g., the IEEE 802.11 or IEEE 802.15.1 specifications in the 900 megahertz (MHz), 2.4 GHz, 3.6 GHz, 5 GHz, and/or 60 GHz frequency bands. That is, as in the example of FIG. 1, portable electronic device 14 can be configured to communicate wirelessly via IEEE 802.11 or 802.15.1 specifications (e.g., with portable wireless communications adapter 12), but may lack the electronics or other circuitry to communicate wirelessly over the WAIC frequency range between 4.2 GHz and 4.4 GHz.

As is further described below, portable wireless communications adapter 12 includes a wireless antenna and wireless access point (WAP) electronics to enable portable wireless communications adapter 12 to communicate wirelessly with portable electronic device 14. Such wireless communications can include, e.g., IEEE 802.11, IEEE 802.15.1, or other standard wireless communications protocols supported by portable electronic device 14 (e.g., a COTS device). Portable wireless communications adapter 12 further includes at least one wireless transceiver (including a transmitter and a receiver) configured to send and receive WAIC communications over the WAIC frequency range between 4.2 GHz and 4.4 GHz. As such, portable wireless communications adapter 12 enables wireless communications between portable electronic device 14 and one or more aircraft systems and sensors 18 (e.g., via aircraft interface device 16) over the WAIC frequency range between 4.2 GHz and 4.4 GHz.

Portable wireless communications adapter 12 further includes a location sensing module that determines a location of portable wireless communications adapter 12 relative to an interior of the aircraft. For instance, as is further described below, portable wireless communications adapter 12 can determine a location of portable wireless communications adapter 12 relative to the interior of the aircraft (e.g., within the interior or outside the interior) based on signal strength of WAIC communications received from one or more WAIC coordinators positioned about the aircraft. Portable wireless communications adapter 12 selectively enables the transmitter of the wireless transceiver in response to determining that portable wireless communications adapter 12 is within the interior of the aircraft. Portable wireless communications adapter 12 selectively disables the transmitter of the wireless transceiver in response to determining that portable wireless communications adapter 12 is not within the interior of the aircraft (e.g., is outside the aircraft). As such, portable wireless communications adapter 12 enables wireless communications between portable electronic device 14 and one or more aircraft systems and sensors 18 (e.g., via aircraft interface device 16) over the WAIC frequency range between 4.2 GHz and 4.4 GHz while adhering to the WAIC standard specifying that WAIC communications are limited to only those wireless communications between aircraft systems and/or components of the same aircraft.

Figure 2:
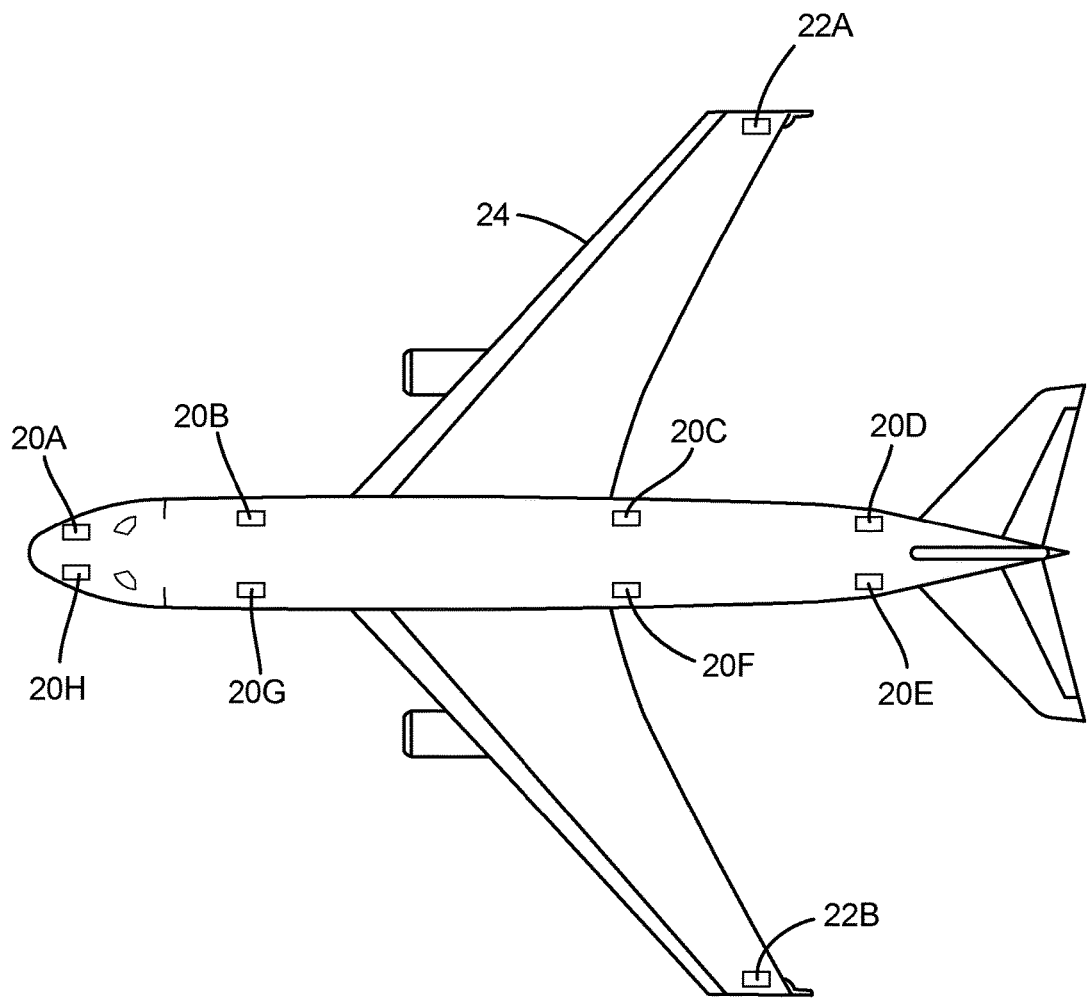
FIG. 2 is a schematic diagram illustrating example Wireless Avionics Intra-Communication (WAIC) coordinators positioned on an aircraft.

FIG. 2 is a schematic diagram illustrating WAIC coordinators 20A, 20B, 20C, 20D, 20E, 20F, 20G, 20H, 22A, and 22B positioned on aircraft 24. In the example of FIG. 2, WAIC coordinators 20A-20H are positioned at various locations within an interior of aircraft 24, such as within the cockpit of aircraft 24, within an electronics bay, a cargo area, the cabin, or other areas within the interior of aircraft 24. WAIC coordinators 22A and 22B are positioned at locations of an exterior of aircraft 24 (i.e., outside the interior of aircraft 24).

WAIC coordinators 20A-20H and 22A-22B are wireless transceivers configured to send and receive WAIC communications over the WAIC frequency range between 4.2 GHz and 4.4 GHz. WAIC coordinators 20A-20H and 22A-22B can, in certain examples, be considered wireless hotspots configured to transmit over the WAIC frequency range to send and receive WAIC communications with one or more devices and/or relay the WAIC communications between any one or more of WAIC coordinators 20A-20H and 22A-22B to provide a wireless network for WAIC communications. That is, each of WAIC coordinators 20A-20H and 22A-22B send and receive WAIC communications in a physical range within which signal strength of the respective coordinator is sufficient to send and receive the WAIC communications. WAIC coordinators 20A-20H, for example, can be positioned about the interior of aircraft 24 so that the physical ranges of WAIC coordinators 20A-20H overlap to provide a wireless network for WAIC communications to a portion of the interior of aircraft 24 or an entirety of the interior of aircraft 24. WAIC coordinators 22A and 22B can be positioned at the exterior of aircraft 24, such as at or near the wingtips of aircraft 24 (illustrated in FIG. 2), at or near the nose and/or tail of aircraft 24, at or near the landing gear of aircraft 24, or other exterior locations of aircraft 24. Though illustrated in the example of FIG. 2 as including eight WAIC coordinators 20A-20H and two WAIC coordinators 22A-22B, it should be understood that any number of WAIC coordinators can be positioned within the interior and/or exterior of aircraft 24.

WAIC coordinators 20A-20H collectively provide a wireless network for WAIC communications between electronic devices within the interior of aircraft 24. Communications between electronic devices located within the interior of aircraft 24 over the WAIC network is accomplished via one or more of the nearest WAIC coordinators 20A-20H. A nearest one or more of WAIC coordinators 20A-20H to the communicating electronic device can, in certain examples, change, such as between flights (e.g., when an electronic device is moved) or during flight, for example, when a communicating electronic device, such as portable wireless communications adapter 12 of FIG. 1, is moved throughout the interior of aircraft 24 during flight.

Each of WAIC coordinators 20A-20H and 22A-22B is associated with a unique identifier, such as a serial number. As is further described below, portable wireless communications adapter 12 (FIG. 1) can determine a location of portable wireless communications adapter 12 relative to an interior of aircraft 24 based on a signal strength of WAIC communications received from one or more of WAIC coordinators 20A-20H and 22A-22B. For instance, portable wireless communications adapter 12 can store and/or receive an association (e.g., a list, a table, or other association) of unique WAIC coordinator identifiers associated with WAIC coordinators 20A-20H located within the interior of aircraft 24 and/or a list of unique WAIC coordinator identifiers associated with WAIC coordinators 22A-22B located at the exterior of aircraft 24. Portable wireless communications adapter 12 can determine that portable wireless communications adapter 12 is not within the interior of aircraft 24 (i.e., is outside aircraft 24) in response to determining that a signal strength of received WAIC communications from any one or more of WAIC coordinators 22A and 22B (or other WAIC coordinators located outside aircraft 24) is greater than a signal strength of received WAIC communications from any one or more of WAIC coordinators 20A-20H that are located within the interior of aircraft 24. Portable wireless communications adapter 12 can determine that portable wireless communications adapter 12 is within the interior of aircraft 24 in response to determining that a signal strength of received WAIC communications from any one or more of WAIC coordinators 20A-20H is greater than a signal strength of received WAIC communications from any one or more of WAIC coordinators 22A-22B located at the exterior of aircraft 24.

As is further described below, portable wireless communications adapter 12 selectively enables the transmitter of the wireless transceiver in response to determining that portable wireless communications adapter 12 is within the interior of aircraft 24. Portable wireless communications adapter 12 selectively disables the transmitter of the wireless transceiver in response to determining that portable wireless communications adapter 12 is not within the interior of aircraft 24. Accordingly, portable wireless communications adapter 12 implementing techniques of this disclosure enables WAIC communications between a portable electronic device (e.g., portable electronic device 14 of FIG. 1) and any one or more aircraft systems and sensors (e.g., one or more aircraft systems and sensors 18 of FIG. 1) while satisfying the WAIC standards which specify that WAIC communications are limited to only those wireless communications between components of the aircraft (e.g., aircraft 24).

Figure 3:
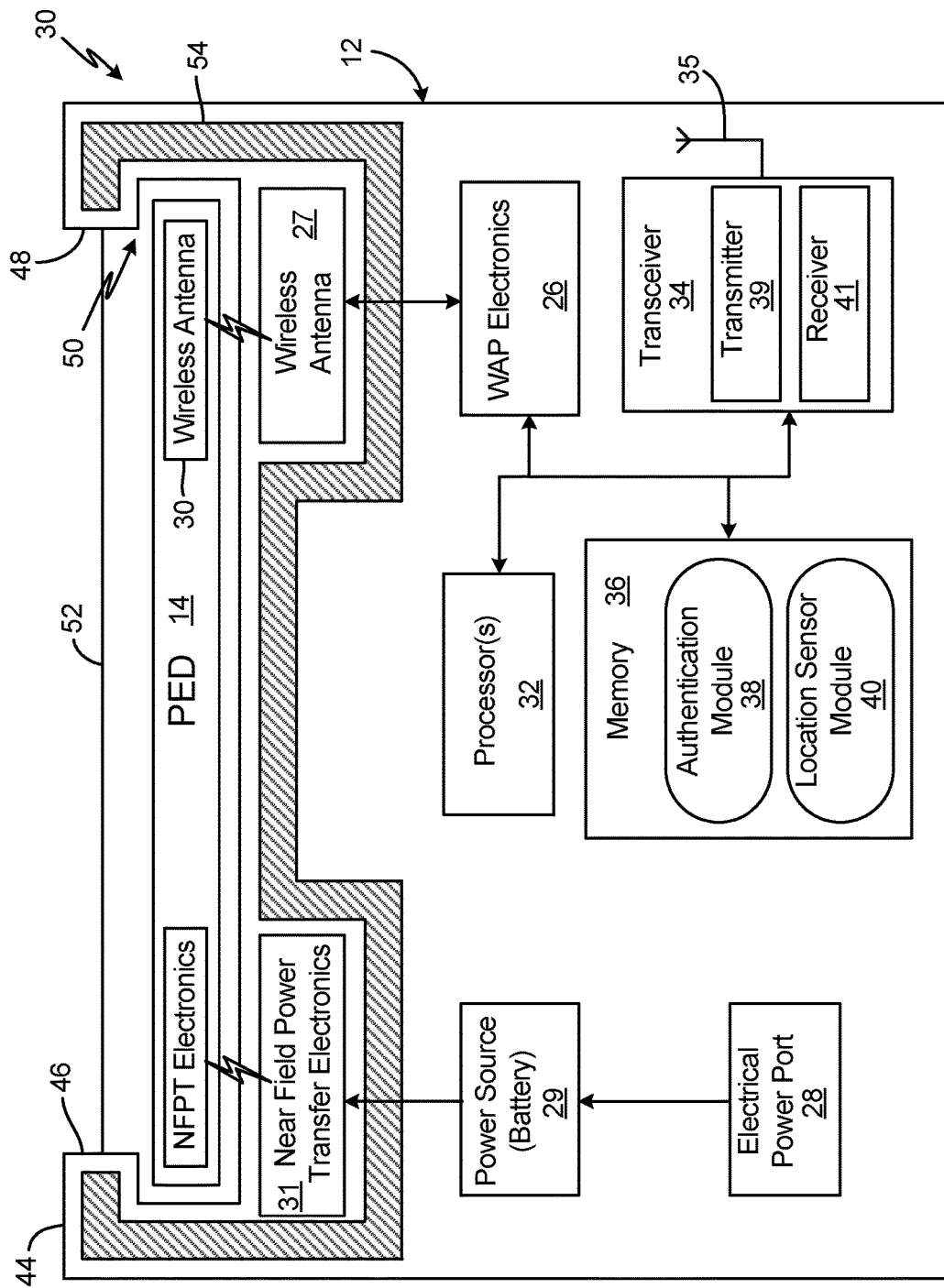
FIG. 3 is a schematic diagram illustrating further details of the portable wireless communications adapter engaged with the portable electronic device.

FIG. 3 is a schematic diagram illustrating further details of portable wireless communications adapter 12 engaged with portable electronic device 14. As illustrated in FIG. 3, portable electronic device 14 (a tablet computer in this example) includes wireless antenna 30. Portable wireless communications adapter 12 includes wireless access point (WAP) electronics 26, wireless antenna 27, electrical power port 28, power source 29 (a battery in this example), near field power transfer electronics 31, one or more processors 32, wireless transceiver 34, WAIC antenna 35, and computer-readable memory 36. Computer-readable memory 36 includes authentication module 38 and location sensing module 40. Transceiver 34 includes wireless transmitter 39 and wireless receiver 41. As further illustrated in FIG. 3, portable wireless communications adapter 12 further includes housing 44 that encloses components of portable wireless communications adapter 12, as is further described below. Housing 44 includes engagement members 46 and 48 that extend from a periphery of housing 44 toward a central region of portable wireless communications adapter 12 to define retaining region (or slot) 50. In some examples, such as the example of FIG. 3, portable wireless communications adapter 12 includes display cover 52 that extends between engagement members 46 and 48. Housing 44 further includes shield 54 formed of a conductive material to shield wireless antenna 27 and near field power transfer electronics 31 from electromagnetic interference, as is further described below.

Wireless antennas 27 and 30 can be configured to communicate wirelessly via, e.g., the IEEE 802.11 or IEEE 802.15.1 specifications in, for example, the 900 megahertz (MHz), 2.4 GHz, 3.6 GHz, 5 GHz, and/or 60 GHz frequency bands. Accordingly, when wirelessly connected, communication of data between portable electronic device 14 and portable wireless communications adapter 12 is achieved via a wireless communications session established by portable wireless communications adapter 12 between WAP electronics 26 and portable electronic device 14. WAP electronics 26 communicatively connects wireless antenna 27 with one or more processors 32, computer-readable memory 36, and transceiver 34 for wireless communications with portable electronic device 14 via the IEEE 802.11, IEEE 802.15.1, or other standard or proprietary wireless protocol.

Processor 32, in some examples, is configured to implement functionality and/or process instructions for execution within portable wireless communications adapter 12. For instance, processor 32 can be capable of processing instructions stored in computer-readable memory 36, such as instructions associated with authentication module 38 and location module 40. Examples of processor 32 can include any one or more of a microprocessor, a controller, a digital signal processor (DSP), an application specific integrated circuit (ASIC), a field-programmable gate array (FPGA), or other equivalent discrete or integrated logic circuitry.

Wireless transceiver 34, as illustrated in FIG. 3, is electrically coupled with WAIC antenna 35 that is configured to send and receive WAIC communications over the WAIC frequency range between 4.2 GHz and 4.4 GHz. Wireless transceiver 34 includes wireless transmitter 39 and wireless receiver 41. Wireless transmitter 39 and wireless receiver 41 include electronic circuitry configured to send (wireless transmitter 39) and receive (wireless receiver 41) WAIC communications over the WAIC frequency range between 4.2 GHz and 4.4 GHz via WAIC antenna 35. Though illustrated and described as including wireless transceiver 34 including both wireless transmitter 39 and wireless receiver 41, it should be understood that in other examples, wireless transmitter 39 and wireless receiver 41 can be separate devices or other equivalent circuitry which, in combination, function to send and receive the WAIC communications over the WAIC frequency range.

Computer-readable memory 36 can be configured to store information within portable wireless communications adapter 12 during operation. Computer-readable memory 36, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory 36 can include volatile and/or non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable memories (EEPROM).

Computer-readable memory 36 can be used to store program instructions for execution by processor 32. For instance, as illustrated in FIG. 3, computer-readable memory 36 can store computer-readable instructions that, when executed by processor 32, cause portable wireless communications adapter 12 to operate in accordance with techniques attributed herein to authentication module 38 and location sensing module 40.

Electrical power port 28 can be a USB or other standard or proprietary interface connector configured for electrical power connection with an external power source. In some examples, portable wireless communications adapter 12 receives electrical power for operation of components of portable wireless communications adapter 12 via electronic power port 28. In certain examples, power source 29 (a battery in this example) can receive electrical power via electrical power port 28 to charge the battery. In other examples, near field power electronics 31 can transfer power from power source 29 to an electronic device (e.g., portable electronic device 14). In other examples, portable wireless communications adapter 12 receives electrical power for operation of components of portable wireless communications adapter 12 from an electronic device (e.g., portable electronic device 14 of FIGS. 1 and 3) via near field power electronics 31. In certain examples, power source 29 can receive electrical power from an electronic device (e.g., portable electronic device 14) via near field power electronics 31 to charge the battery.

As illustrated in FIG. 3, portable wireless communications adapter 12 includes housing 44 that encloses components of portable wireless communications adapter 12. That is, as illustrated in FIG. 3, each of WAP electronics 26, wireless antenna 27, electrical power port 28, power source 29, near field power electronics 31, one or more processors 32, wireless transceiver 34, WAIC antenna 35, and computer-readable memory 36 is positioned within housing 44.

Housing 44 includes engagement members 46 and 48 that extend from a periphery of housing 44 (e.g., from opposing sides of the periphery of housing 44) toward a central region of portable wireless communications adapter 12 to define retaining region (or slot) 50 configured to engage with and secure portable electronic device 14 within wireless communications adapter 12 during operation thereof. For instance, portable electronic device 14 can be inserted into retaining region (or slot) 50 such that engagement members 46 and 48 extend beyond the edges of portable electronic device 14 by a distance sufficient to retain portable electronic device 14 within housing 44. In some examples, such as the example of FIG. 3, portable wireless communications adapter 12 includes display cover 52 that extends between engagement members 46 and 48 to protect a display of portable electronic device 14 and to further retain portable electronic device 14 within portable wireless communications adapter 12. Display cover 52 can be formed of any transparent or semi-transparent material (e.g., plastic, glass, or other transparent or semi-transparent material) to enable viewing of content displayed by portable electronic device 14 and/or to enable user interaction via, e.g., user gesture input (such as when the display of portable electronic device 14 is a touch-sensitive display).

Portable wireless communications adapter 12, as illustrated in FIG. 3, further includes shield 54. Shield 54 is an electrical conductor that is formed of an electrically-conductive material to shield wireless antenna 27 and near field power transfer electronics 31 from electromagnetic interference. Shield 54 is positioned within portable wireless communications adapter 12 such that near field power transfer electronics 31 and wireless antenna 27 are disposed on a first side of shield 54 within housing 44 adjacent retaining region 50 (and portable electronic device 14 when inserted into retaining region 50). Other components of portable wireless communications adapter 12 (i.e., WAP electronics 26, electrical power port 28, power source 29, near field power electronics 31, one or more processors 32, wireless transceiver 34, WAIC antenna 35, and computer-readable memory 36) are disposed on a second side of shield 54, opposite the first side.

As illustrated in FIG. 3, near field power transfer electronics 31 is electrically connected via a wired connection with power source 29 (e.g., through shield 54). WAP electronics 26 is electrically connected via a wired connection with wireless antenna 27 (e.g., through shield 54). As such, during operation of portable wireless communications adapter 12 with portable electronic device 14 inserted into retaining region 50, near field power transfer electronics 31 and wireless antenna 27 are disposed on a first side of shield 54 and are separated from remaining components of wireless communications adapter 12 (i.e., WAP electronics 26, electrical power port 28, power source 29, near field power electronics 31, one or more processors 32, wireless transceiver 34, WAIC antenna 35, and computer-readable memory 36) that are disposed on a second side of shield 54 to reduce electromagnetic interference.

In operation, when engaged with a portable electronic device, such as portable electronic device 14, authentication module 38 receives authentication information corresponding to the portable electronic device via wireless antenna 27 and WAP electronics 26. Authentication information of the portable electronic device can include a serial number or other unique identifier of the portable electronic device. Computer-readable memory 36 stores a list, table, or other association of unique identifiers of portable electronic devices that are authorized for use with portable wireless communications adapter 12. Authentication module 38 compares the unique identifier of the portable electronic device with the list or other association of authorized portable electronic devices to determine whether the portable electronic device is authenticated. In response to determining that the portable electronic device is authenticated (e.g., included in the list or other association), authentication module 38 selectively enables wireless transmitter 39 for sending WAIC communications. In response to determining that the portable electronic device is not authenticated (e.g., not included in the list or other association), authentication module 38 selectively disables wireless transmitter 39 to prevent wireless transmitter 39 from sending WAIC communications. Accordingly, authentication module 38 can selectively enable and disable wireless transmitter 39 to limit use of portable wireless communications adapter 12 to only those portable electronic devices that are authorized, thereby enhancing security of operation.

In some examples, authentication module 38 receives authentication information corresponding to an aircraft. Authentication information corresponding to an aircraft can include an aircraft tail number or other unique identifier of the aircraft. In some examples, authentication information corresponding to the aircraft can include unique identifiers (e.g., a serial number or other unique identifier) of one or more WAIC coordinators positioned on the aircraft and from which WAIC communications are received via wireless receiver 41.

Computer-readable memory 36 can store a list, table, or other association of authorized WAIC coordinators, aircraft tail numbers, or both. Authentication module 38 can compare one or more of the unique identifier of the aircraft and the unique identifiers of the one or more WAIC coordinators with the list or other association of authorized aircraft and/or WAIC coordinators to determine whether the aircraft and/or WAIC coordinators are authenticated. In response to determining that the aircraft and/or WAIC coordinators are authenticated, authentication module 38 selectively enables wireless transmitter 39 for sending WAIC communications (e.g., corresponding to data received from portable electronic device 14 via wireless antenna 27 and WAP electronics 26 over the wireless communications session). In response to determining that the aircraft and/or WAIC coordinators are not authenticated, authentication module 38 selectively disables wireless transmitter 39 to prevent wireless transmitter 39 from sending WAIC communications. As such, authentication module 38 can selectively enable and disable wireless transmitter 39 to limit use of portable wireless communications adapter 12 to only those aircraft that are authorized and/or those WAIC coordinators that are authorized. In some examples, the list, table, or other association of authorized WAIC coordinators can include only a subset of the WAIC coordinators on the aircraft. As such, WAIC communication can be limited to specific regions of aircraft, such as within the cockpit, within an electronics bay, a cargo area, the cabin, or other areas within the interior of the aircraft.

Location sensing module 40 determines a location of portable wireless communications adapter 12 relative to an interior of the aircraft based on WAIC communications received at wireless transceiver 34. For example, computer-readable memory 36 can store a list or other association of unique identifiers of WAIC coordinators that are located within the interior of the aircraft, such as unique identifiers of WAIC coordinators 20A-20H (FIG. 2). In some examples, computer-readable memory 36 can store a list or other association of unique identifiers of WAIC coordinators that are located outside the interior of the aircraft, such as unique identifiers of WAIC coordinators 22A and 22B (FIG. 2).

Location sensing module 40, in certain examples, determines that portable wireless communications adapter 12 is located within the interior of the aircraft in response to determining that a signal strength of WAIC communications received from any one or more of the WAIC coordinators located within the aircraft interior is greater than a signal strength of WAIC communications received from any one or more of the WAIC coordinators located outside the interior of the aircraft. Location sensing module 40 can determine that portable wireless communications adapter 12 is not located within the aircraft interior in response to determining that a signal strength of WAIC communications received from any one or more of the WAIC coordinators located outside the interior of the aircraft is greater than a signal strength of WAIC communications received from any one or more of the WAIC coordinators located within the aircraft interior.

In some examples, location sensing module 40 determines that portable wireless communications adapter 12 is located within the aircraft interior in response to determining that WAIC communications are received from any one or more of the WAIC coordinators located within the aircraft interior and that no WAIC communications are received from any of the WAIC coordinators located outside the aircraft interior. In certain examples, location sensing module 40 determines that portable wireless communications adapter 12 is located outside the aircraft interior in response to determining that no WAIC communications are received from any of the WAIC coordinators located within the aircraft interior.

Location sensing module 40 selectively enables wireless transmitter 39 to send WAIC communications in response to determining that portable wireless communications adapter 12 is located within the interior of the aircraft. Location sensing module 40 selectively disables wireless transmitter 39 to prevent wireless transceiver 34 from sending WAIC communications in response to determining that portable wireless communications adapter 12 is not located within the interior of the aircraft.

Accordingly, portable wireless communications adapter 12 selectively enables and disables wireless transmitter 39 based on a determined location of portable wireless communications adapter 12 relative to an interior of the aircraft. As such, portable wireless communications adapter 12 can enable a portable electronic device to communicate wirelessly via WAIC communications while adhering to WAIC standards which limit such wireless communications to only those communications between systems or other components of the aircraft.

Figure 4:
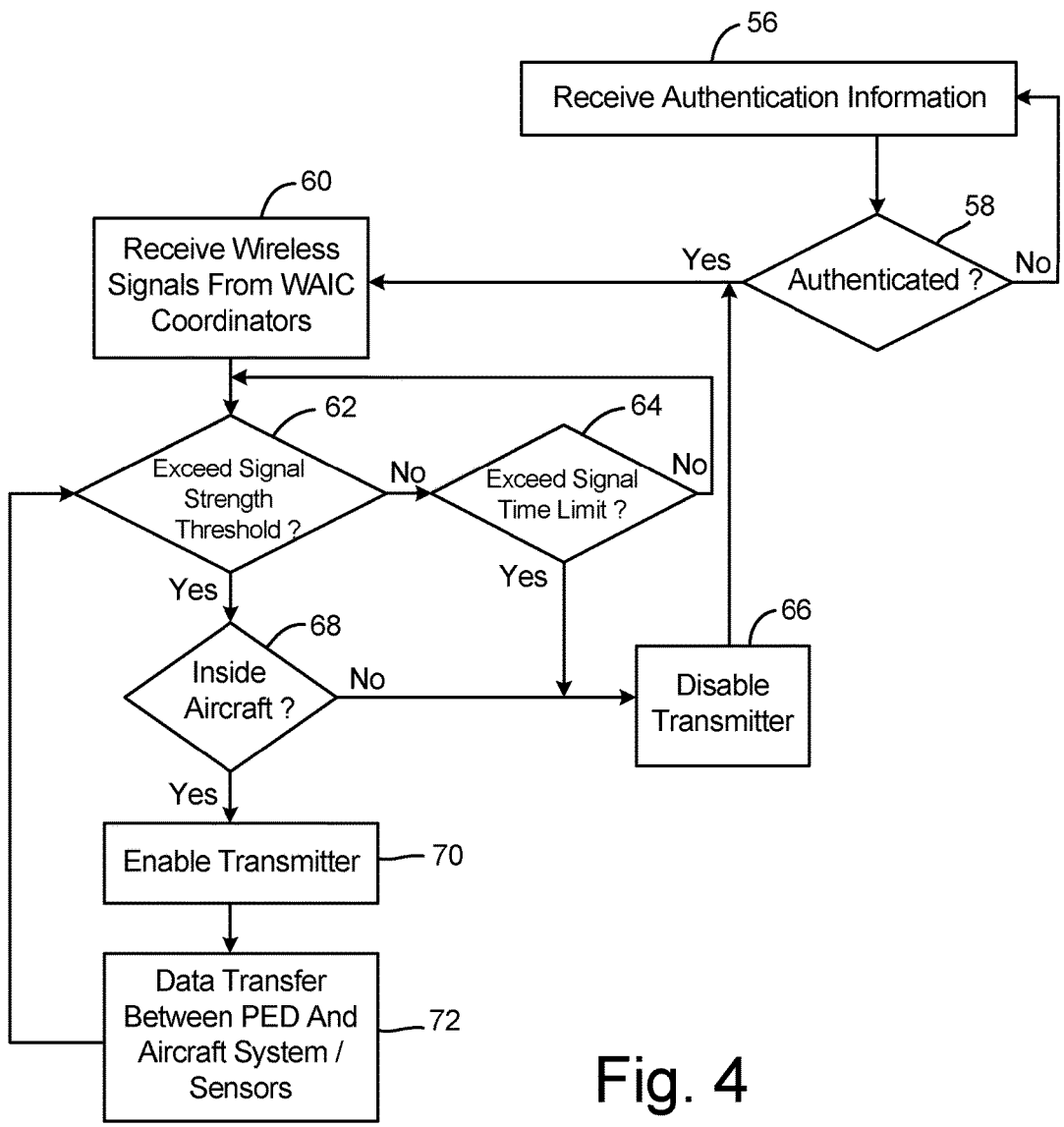
FIG. 4 is a flow diagram illustrating example operations to establish communications between a portable electronic device and aircraft systems using the portable wireless communications adapter.

FIG. 4 is a flow diagram illustrating example operations to establish communications between a portable electronic device and one or more aircraft systems and sensors using a portable wireless communications adapter mated with the portable electronic device. For purposes of clarity and ease of discussion, the example operations are described below within the context of system 10 of FIG. 1.

Authentication information is received by the portable wireless communications adapter (Step 56). For example, authentication module 38 of portable wireless communications adapter 12 can receive authentication information from portable electronic device 14 via wireless antenna 27 and WAP electronics 26 using, e.g., the IEEE 802.11, IEEE 802.15.1, or other standard wireless communication protocol supported by portable electronic device 14. In some examples, authentication module 38 can receive authentication information corresponding to any one or more of aircraft 24, WAIC coordinators 20A-20H, and WAIC coordinators 22A-22B via wireless receiver 41 of wireless transceiver 34.

It is determined whether the portable electronic device, the aircraft, and/or the WAIC coordinators are authenticated (Step 58). For instance, authentication module 38 can determine that the portable electronic device is authenticated in response to determining that a unique identifier of the portable electronic device received via the authentication information is included in a list or other association of authorized portable electronic devices stored at computer-readable memory 36. Authentication module 38 can determine that the aircraft and/or the WAIC coordinators are authenticated in response to determining that unique identifiers of the aircraft and/or the WAIC coordinators are included in a list or other association of authorized aircraft and/or WAIC coordinators. In some examples, portable wireless communications adapter 12 can disable wireless transmitter 39 of portable wireless communications adapter 12 until authentication is confirmed.

In response to determining that the portable electronic device, the aircraft, and/or the WAIC coordinators are not authenticated ("NO" branch of Step 58), portable wireless communications adapter 12 continues to receive authentication information (Step 56) with wireless transmitter 39 disabled. In response to determining that the portable electronic device, the aircraft, and/or the WAIC coordinators are authenticated ("YES" branch of Step 58), portable wireless communications adapter 12 receives wireless signals from WAIC coordinators via wireless receiver 41 (Step 60) and determines, based on the received wireless signals from the WAIC coordinators, whether a signal strength of received WAIC communications exceeds a WAIC communications signal strength threshold (Step 62).

In response to determining that the signal strength of received WAIC communications fails to exceed the WAIC communications signal strength threshold ("NO" branch of Step 62), the portable wireless communications adapter determines whether the signal strength of received WAIC communications has failed to exceed the WAIC communications signal strength threshold for a threshold time limit (Step 64). In response to determining that the threshold time limit has not been exceed ("NO" branch of Step 64), the portable wireless communications adapter continues to determine whether the signal strength of received WAIC communications exceeds the signal strength threshold (Step 62). In response to determining that the threshold time limit is exceeded ("YES" branch of Step 64), the portable wireless communications adapter selectively disables the wireless transmitter (Step 66).

In response to determining that the WAIC communications signal strength received by the portable wireless communications adapter exceeds the WAIC communications signal strength threshold ("YES" branch of Step 62), a location of the portable wireless communications adapter relative to an interior of the aircraft is determined (Step 68). For example, wireless receiver 41 can receive WAIC communications from any one or more of WAIC coordinators 20A-20H and 22A-22B. Location sensing module 40 can determine the location of portable wireless communications adapter 12 relative to the interior of aircraft 24 based on the signal strength of the WAIC communications received from the WAIC coordinators.

In response to determining that the portable wireless communications adapter is not within the interior of the aircraft ("NO" branch of Step 68), the portable wireless communications adapter selectively disables the wireless transmitter (Step 66). For instance, in response to determining that portable wireless communications adapter 12 is not within the interior of aircraft 24, location sensing module 40 can disable wireless transmitter 39 from sending WAIC communications. In some examples, such as the example of FIG. 4, location sensing module 40 can enable wireless receiver 41 to receive WAIC signals from WAIC coordinators configured to establish a communicative connection, but may prevent wireless transmitter 39 from sending WAIC communications, such as to establish a communicative connection with the WAIC coordinators, in response to determining that portable wireless communications adapter 12 is not within the interior of aircraft 24. As such, as illustrated in FIG. 4, portable wireless communications adapter 12 can continue to receive WAIC signals from WAIC coordinators (via wireless receiver 41) to determine the location of portable wireless communications adapter 12 relative to the aircraft interior (Step 68) while preventing portable wireless communications adapter 12 from transmitting WAIC communications and establishing a communicative connection with the WAIC coordinators (via wireless transmitter 39) when portable wireless communications adapter 12 is determined to be outside the interior of aircraft 24.

In response to determining that the portable wireless communications adapter is within the interior of the aircraft ("YES" branch of Step 68), the portable wireless communications adapter selectively enables the wireless transmitter (Step 70) and transfers data between the portable electronic device and the one or more aircraft systems and sensors received via the WAIC communications (Step 72). For example, in response to determining that portable wireless communications adapter 12 is within the interior of aircraft 24, location sensing module 40 can selectively enable wireless transmitter 39. Portable wireless communications adapter 12 can transfer data received from one or more aircraft systems and sensors 18 (or aircraft interface device 16) via WAIC communications at wireless receiver 41 to portable electronic device 14 through wireless antenna 27 and wireless access point electronics 26 (e.g., via the IEEE 802.11, IEEE 802.15.1, or other standard or proprietary wireless communications interface supported by portable electronic device 14). Portable wireless communications adapter 12 can transfer data received from portable electronic device 14 to one or more aircraft systems and sensors 18 (or aircraft interface device 16) via WAIC communications transmitted by wireless transmitter 39.

Accordingly, portable wireless communications adapter 12 implementing techniques described herein routes data between a portable electronic device and one or more aircraft systems and/or sensors via WAIC communications in the frequency range between 4.2 GHz and 4.4 GHz. Portable wireless communications adapter 12 determines a location of the adapter relative to an interior of an aircraft and selectively enables and disables the wireless transmitter based on the determined location, thereby enhancing security and adhering to the WAIC standards specifying that WAIC communications are to be limited to only those wireless communications between aircraft systems and/or components of the aircraft. Portable wireless communications adapter 12 can further enable and disable the wireless transmitter based on authentication information corresponding to one or more of the portable electronic device, the aircraft, and the WAIC coordinators, thereby further enhancing security of communications.

Discussion of Possible Embodiments

The following are non-exclusive descriptions of possible embodiments of the present invention.

A portable wireless communications adapter includes a wireless antenna, wireless access point electronics, a wireless receiver, a wireless transmitter, and a location sensing module. The wireless antenna and wireless access point electronics are configured to communicate wirelessly with a portable electronic device. The wireless receiver is configured to receive Wireless Avionics Intra-Communication (WAIC) communications over a WAIC frequency range between 4.2 gigahertz (GHz) and 4.4 GHz. The wireless transmitter is configured to send WAIC communications over the WAIC frequency range between 4.2 GHz and 4.4 GHz. The location sensing module is configured to determine a location of the portable wireless communications adapter relative to an interior of an aircraft based on WAIC communications received at the wireless receiver, selectively enable the wireless transmitter to send WAIC communications in response to determining that the portable wireless communications adapter is located within the interior of the aircraft, and selectively disable the wireless transmitter to prevent the wireless transmitter from sending WAIC communications in response to determining that the portable wireless communications adapter is not located within the interior of the aircraft The portable wireless communications adapter of the preceding paragraph can optionally include, additionally and/or alternatively, any one or more of the following features, configurations, operations, and/or additional components:

The wireless antenna and the wireless access point electronics can be configured to communicate wirelessly with the portable electronic device via one of an Institute of Electrical and Electronics Engineers (IEEE) 802.11 and an IEEE 802.15.1 wireless communications protocol.

The wireless antenna and the wireless access point electronics can be configured to communicate wirelessly with the portable electronic device via one of the IEEE 802.11 and the IEEE 802.15.1 wireless communications protocol in at least one of a 900 megahertz (MHz), 2.4 GHz, 3.6 GHz, 5 GHz, and a 60 GHz frequency band.

The portable wireless communications adapter can further include a housing configured to engage with the portable electronic device. The housing can include a plurality of engagement members extending from a periphery of the housing to define a retention space sized to receive the portable electronic device and secure the portable electronic device to the housing.

The housing further can further include an electromagnetic shield located within the housing. The wireless antenna can be located within the housing at a first side of the electromagnetic shield adjacent the retention space. The wireless access point electronics, the wireless receiver, and the wireless transmitter can be located at a second side of the electromagnetic shield opposite the first side of the electromagnetic shield.

The portable wireless communications adapter can further include near field power transfer electronics located within the housing at the first side of the electromagnetic shield. The near field power transfer electronics can be configured to wirelessly transfer electrical power with wireless power transfer electronics of the portable electronic device.

The location sensing module can be configured to determine the location of the portable wireless communications adapter relative to the interior of the aircraft based on the WAIC communications received at the wireless receiver from one or more WAIC coordinators positioned on the aircraft.

The location sensing module can be configured to determine the location of the portable wireless communications adapter relative to the interior of the aircraft based on signal strength of the WAIC communications received at the wireless receiver from the one or more WAIC coordinators positioned on the aircraft.

The location sensing module can be configured to determine the location of the portable wireless communications adapter relative to the interior of the aircraft based on the signal strength of the WAIC communications received from the one or more WAIC coordinators by: comparing a first signal strength of WAIC communications received from a first WAIC coordinator positioned at a first location that is within the interior of the aircraft to a second signal strength of WAIC communications received from a second WAIC coordinator positioned at a second location that is not within the interior of the aircraft; determining that the portable wireless communications adapter is located within the interior of the aircraft in response to determining that the first signal strength is greater than the second signal strength; and determining that the portable wireless communications adapter is not located within the interior of the aircraft in response to determining that the second signal strength is greater than the first signal strength.

The portable wireless communications adapter can further include an authentication module configured to: determine whether the portable electronic device is authenticated for use with the portable wireless communications adapter; selectively enable the wireless transmitter in response to determining that the portable electronic device is authenticated for use with the portable wireless communications adapter; and selectively disable the wireless transmitter in response to determining that the portable electronic device is not authenticated for use with the portable wireless communications adapter.

The authentication module can be configured to determine whether the portable electronic device is authenticated for use with the portable wireless communications adapter based on a unique identifier of the portable electronic device received from the portable electronic device via the wireless antenna and the wireless access point electronics.

The portable wireless communications adapter can further include an authentication module configured to: determine whether the portable wireless communications adapter is authenticated for use with the aircraft; selectively enable the wireless transmitter in response to determining that the portable wireless communications adapter is authenticated for use with the aircraft; and selectively disable the wireless transmitter in response to determining that the portable wireless communications adapter is not authenticated for use with the aircraft.

The authentication module can be configured to determine whether the portable wireless communications adapter is authenticated for use with the aircraft based on authentication information received via the wireless receiver, the authentication information including a unique identifier of the aircraft.

The authentication module can be configured to determine whether the portable wireless communications adapter is authenticated for use with the aircraft based on authentication information received via the wireless receiver, the authentication information including unique identifiers of one or more WAIC coordinators.

A method includes establishing, using a wireless antenna and wireless access point electronics of a portable wireless communications adapter, a wireless communications session with a portable electronic device for wireless communications between the portable wireless communications adapter and the portable electronic device. The method further includes receiving, by a wireless receiver of the portable wireless communications adapter, Wireless Avionics Intra-Communication (WAIC) communications over a WAIC frequency range between 4.2 gigahertz (GHz) and 4.4 GHz, and determining, by the portable wireless communications adapter, location of the portable wireless communications adapter relative to an interior of an aircraft based on the WAIC communications received over the WAIC frequency range. The method further includes selectively enabling a wireless transmitter of the portable wireless communications adapter to send WAIC communications over the WAIC frequency range corresponding to wireless data received from the portable electronic device via the wireless communications session in response to determining that the portable wireless communications adapter is located within the interior of the aircraft. The method further includes selectively disabling the wireless transmitter to prevent the wireless transmitter from sending WAIC communications over the WAIC frequency range in response to determining that the portable wireless communications adapter is not located within the interior of the aircraft.

The method of the preceding paragraph can optionally include, additionally and/or alternatively, any one or more of the following features, configurations, operations, and/or additional components:

Establishing the wireless communications session with the portable electronic device can include establishing a wireless communications session with the portable electronic device for wireless communications between the portable wireless communications adapter and the portable electronic device via one of an Institute of Electrical and Electronics Engineers (IEEE) 802.11 and an IEEE 802.15.1 wireless communications protocol in at least one of a 900 megahertz (MHz), a 2.4 GHz, a 3.6 GHz, a 5 GHz, and a 60 GHz frequency band.

Determining the location of the portable wireless communications adapter relative to the interior of the aircraft can include determining the location of the portable wireless communications adapter relative to the interior of the aircraft based on signal strength of the WAIC communications received over the WAIC frequency range from the one or more WAIC coordinators positioned on the aircraft.

Determining the location of the portable wireless communications adapter relative to the interior of the aircraft based on signal strength of the WAIC communications received over the WAIC frequency range from the one or more WAIC coordinators positioned on the aircraft can include: comparing a first signal strength of first WAIC communications received over the WAIC frequency range from a first WAIC coordinator positioned at a first location that is within the interior of the aircraft to a second signal strength of second WAIC communications received over the WAIC frequency range from a second WAIC coordinator positioned at a second location that is not within the interior of the aircraft; determining that the portable wireless communications adapter is located within the interior of the aircraft in response to determining that the first signal strength is greater than the second signal strength; and determining that the portable wireless communications adapter is not located within the interior of the aircraft in response to determining that the second signal strength is greater than the first signal strength.

The method can further include: receiving, by the portable wireless communications adapter, authentication data from the portable electronic device via the wireless communications session with the portable electronic device, the authentication data including a unique identifier of the portable electronic device; determining, based on the unique identifier of the portable electronic device, whether the portable electronic device is authenticated for use with the portable wireless communications adapter; selectively enabling the wireless transmitter in response to determining that the portable electronic device is authenticated for use with the portable wireless communications adapter; and selectively disabling the wireless transmitter in response to determining that the portable electronic device is not authenticated for use with the portable wireless communications adapter.

The method can further include: receiving, by the wireless receiver, authentication data from one or more WAIC coordinators positioned on the aircraft; determining, based on the authentication data, whether the portable wireless communications adapter is authenticated for use with the aircraft; selectively enabling the wireless transmitter in response to determining that the portable wireless communications adapter is authenticated for use with the aircraft; and selectively disabling the wireless transmitter in response to determining that the portable wireless communications adapter is not authenticated for use with the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A portable wireless communications adapter comprising:
   a wireless antenna and wireless access point electronics configured to communicate wirelessly with a portable electronic device;
   a wireless receiver configured to receive Wireless Avionics Intra-Communication (WAIC) communications over a WAIC frequency range between 4.2 gigahertz (GHz) and 4.4 GHz;
   a wireless transmitter configured to send WAIC communications over the WAIC frequency range between 4.2 GHz and 4.4 GHz;
   a location sensing module configured to:
      determine a location of the portable wireless communications adapter relative to an interior of an aircraft based on WAIC communications received at the wireless receiver;
      selectively enable the wireless transmitter to send WAIC communications in response to determining that the portable wireless communications adapter is located within the interior of the aircraft; and
      selectively disable the wireless transmitter to prevent the wireless transmitter from sending WAIC communications in response to determining that the portable wireless communications adapter is not located within the interior of the aircraft.

2. The portable wireless communications adapter of claim 1,
   wherein the wireless antenna and the wireless access point electronics are configured to communicate wirelessly with the portable electronic device via one of an Institute of Electrical and Electronics Engineers (IEEE) 802.11 and an IEEE 802.15.1 wireless communications protocol.

3. The portable wireless communications adapter of claim 2,
   wherein the wireless antenna and the wireless access point electronics are configured to communicate wirelessly with the portable electronic device via one of the IEEE 802.11 and the IEEE 802.15.1 wireless communications protocol in at least one of a 900 megahertz (MHz), 2.4 GHz, 3.6 GHz, 5 GHz, and a 60 GHz frequency band.

4. The portable wireless communications adapter of claim 1, further comprising:
   a housing configured to engage with the portable electronic device, the housing comprising a plurality of engagement members extending from a periphery of the housing to define a retention space sized to receive the portable electronic device and secure the portable electronic device to the housing.

5. The portable wireless communications adapter of claim 4,
   wherein the housing further comprises an electromagnetic shield located within the housing;
   wherein the wireless antenna is located within the housing at a first side of the electromagnetic shield adjacent the retention space; and
   wherein the wireless access point electronics, the wireless receiver, and the wireless transmitter are located at a second side of the electromagnetic shield opposite the first side of the electromagnetic shield.

6. The portable wireless communications adapter of claim 5, further comprising:
   near field power transfer electronics located within the housing at the first side of the electromagnetic shield, the near field power transfer electronics configured to wirelessly transfer electrical power with wireless power transfer electronics of the portable electronic device.

7. The portable wireless communications adapter of claim 1,
   wherein the location sensing module is configured to determine the location of the portable wireless communications adapter relative to the interior of the aircraft based on the WAIC communications received at the wireless receiver from one or more WAIC coordinators positioned on the aircraft.

8. The portable wireless communications adapter of claim 7,
   wherein the location sensing module is configured to determine the location of the portable wireless communications adapter relative to the interior of the aircraft based on signal strength of the WAIC communications received at the wireless receiver from the one or more WAIC coordinators positioned on the aircraft.

9. The portable wireless communications adapter of claim 8,
   wherein the location sensing module is configured to determine the location of the portable wireless communications adapter relative to the interior of the aircraft based on the signal strength of the WAIC communications received from the one or more WAIC coordinators by:
comparing a first signal strength of WAIC communications received from a first WAIC coordinator positioned at a first location that is within the interior of the aircraft to a second signal strength of WAIC communications received from a second WAIC coordinator positioned at a second location that is not within the interior of the aircraft;
determining that the portable wireless communications adapter is located within the interior of the aircraft in response to determining that the first signal strength is greater than the second signal strength; and
determining that the portable wireless communications adapter is not located within the interior of the aircraft in response to determining that the second signal strength is greater than the first signal strength.

10. The portable wireless communications adapter of claim 1, further comprising:
an authentication module configured to:
determine whether the portable electronic device is authenticated for use with the portable wireless communications adapter;
selectively enable the wireless transmitter in response to determining that the portable electronic device is authenticated for use with the portable wireless communications adapter; and
selectively disable the wireless transmitter in response to determining that the portable electronic device is not authenticated for use with the portable wireless communications adapter.

11. The portable wireless communications adapter of claim 10,
wherein the authentication module is configured to determine whether the portable electronic device is authenticated for use with the portable wireless communications adapter based on a unique identifier of the portable electronic device received from the portable electronic device via the wireless antenna and the wireless access point electronics.

12. The portable wireless communications adapter of claim 1, further comprising:
an authentication module configured to:
determine whether the portable wireless communications adapter is authenticated for use with the aircraft;
selectively enable the wireless transmitter in response to determining that the portable wireless communications adapter is authenticated for use with the aircraft; and
selectively disable the wireless transmitter in response to determining that the portable wireless communications adapter is not authenticated for use with the aircraft.

13. The portable wireless communications adapter of claim 12,
wherein the authentication module is configured to determine whether the portable wireless communications adapter is authenticated for use with the aircraft based on authentication information received via the wireless receiver, the authentication information including a unique identifier of the aircraft.

14. The portable wireless communications adapter of claim 12,
wherein the authentication module is configured to determine whether the portable wireless communications adapter is authenticated for use with the aircraft based on authentication information received via the wireless receiver, the authentication information including unique identifiers of one or more WAIC coordinators.

15. A method comprising:
establishing, using a wireless antenna and wireless access point electronics of a portable wireless communications adapter, a wireless communications session with a portable electronic device for wireless communications between the portable wireless communications adapter and the portable electronic device;
receiving, by a wireless receiver of the portable wireless communications adapter, Wireless Avionics Intra-Communication (WAIC) communications over a WAIC frequency range between 4.2 gigahertz (GHz) and 4.4 GHz;
determining, by the portable wireless communications adapter, location of the portable wireless communications adapter relative to an interior of an aircraft based on the WAIC communications received over the WAIC frequency range;
selectively enabling a wireless transmitter of the portable wireless communications adapter to send WAIC communications over the WAIC frequency range corresponding to wireless data received from the portable electronic device via the wireless communications session in response to determining that the portable wireless communications adapter is located within the interior of the aircraft; and
selectively disabling the wireless transmitter to prevent the wireless transmitter from sending WAIC communications over the WAIC frequency range in response to determining that the portable wireless communications adapter is not located within the interior of the aircraft.

16. The method of claim 15,
wherein establishing the wireless communications session with the portable electronic device comprises establishing a wireless communications session with the portable electronic device for wireless communications between the portable wireless communications adapter and the portable electronic device via one of an Institute of Electrical and Electronics Engineers (IEEE) 802.11 and an IEEE 802.15.1 wireless communications protocol in at least one of a 900 megahertz (MHz), a 2.4 GHz, a 3.6 GHz, a 5 GHz, and a 60 GHz frequency band.

17. The method of claim 15,
wherein determining the location of the portable wireless communications adapter relative to the interior of the aircraft comprises determining the location of the portable wireless communications adapter relative to the interior of the aircraft based on signal strength of the WAIC communications received over the WAIC frequency range from the one or more WAIC coordinators positioned on the aircraft.

18. The method of claim 17,
wherein determining the location of the portable wireless communications adapter relative to the interior of the aircraft based on signal strength of the WAIC communications received over the WAIC frequency range from the one or more WAIC coordinators positioned on the aircraft comprises:

comparing a first signal strength of first WAIC communications received over the WAIC frequency range from a first WAIC coordinator positioned at a first location that is within the interior of the aircraft to a second signal strength of second WAIC communications received over the WAIC frequency range from a second WAIC coordinator positioned at a second location that is not within the interior of the aircraft;

determining that the portable wireless communications adapter is located within the interior of the aircraft in response to determining that the first signal strength is greater than the second signal strength; and determining that the portable wireless communications adapter is not located within the interior of the aircraft in response to determining that the second signal strength is greater than the first signal strength.

19. The method of claim 15, further comprising:

receiving, by the portable wireless communications adapter, authentication data from the portable electronic device via the wireless communications session with the portable electronic device, the authentication data including a unique identifier of the portable electronic device;

determining, based on the unique identifier of the portable electronic device, whether the portable electronic device is authenticated for use with the portable wireless communications adapter;

selectively enabling the wireless transmitter in response to determining that the portable electronic device is authenticated for use with the portable wireless communications adapter; and selectively disabling the wireless transmitter in response to determining that the portable electronic device is not authenticated for use with the portable wireless communications adapter.

20. The method of claim 15, further comprising:

receiving, by the wireless receiver, authentication data from one or more WAIC coordinators positioned on the aircraft;

determining, based on the authentication data, whether the portable wireless communications adapter is authenticated for use with the aircraft;

selectively enabling the wireless transmitter in response to determining that the portable wireless communications adapter is authenticated for use with the aircraft; and selectively disabling the wireless transmitter in response to determining that the portable wireless communications adapter is not authenticated for use with the aircraft.

* * * * *